(12) United States Patent
Yeager

(10) Patent No.: US 9,552,034 B2
(45) Date of Patent: Jan. 24, 2017

(54) SYSTEMS AND METHODS FOR PROVIDING LOCAL HARDWARE LIMIT MANAGEMENT AND ENFORCEMENT

(71) Applicant: QUALCOMM INCORPORATED, San Diego, CA (US)

(72) Inventor: Hans Lee Yeager, La Jolla, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 182 days.

(21) Appl. No.: 14/340,468

(22) Filed: Jul. 24, 2014

(65) Prior Publication Data
US 2015/0309551 A1 Oct. 29, 2015

Related U.S. Application Data

(60) Provisional application No. 61/985,938, filed on Apr. 29, 2014.

(51) Int. Cl.
*G06F 1/32* (2006.01)
*G06F 1/00* (2006.01)
(Continued)

(52) U.S. Cl.
CPC ............ *G06F 1/3203* (2013.01); *G06F 1/206* (2013.01); *G06F 1/28* (2013.01); *G06F 1/3206* (2013.01); *G06F 1/3234* (2013.01); *G06F 11/3013* (2013.01); *G06F 11/3058* (2013.01); *G06F 11/0721* (2013.01); *G06F 11/3409* (2013.01); *G06F 11/3466* (2013.01)

(58) Field of Classification Search
CPC .. G06F 1/3234; G06F 1/3206; G06F 11/3409; G06F 11/0721; G06F 11/3466; G06F 1/3203; G06F 1/206; G06F 1/28; G06F 11/3013; G06F 11/3058
USPC ................... 713/300, 320; 714/47.1, 47.2
See application file for complete search history.

(56) References Cited

U.S. PATENT DOCUMENTS 8,547,164 B2   10/2013   Flores et al.
8,595,525 B2   11/2013   Anderson et al.
(Continued)

FOREIGN PATENT DOCUMENTS

WO    2013006240 A2    1/2013

OTHER PUBLICATIONS

Aseem Gupta et al., On Chip Communication-Architecture Based Thermal Management for SoCs; University of California, Colorado State University, Freescale Semiconductor Inc.;2009; pp. No. 76-79.
(Continued)

*Primary Examiner* — Ji H Bae
(74) *Attorney, Agent, or Firm* — Smith Tempel

(57) ABSTRACT

Systems and methods for providing local hardware limit management and enforcement are described. One embodiment includes a system for managing and enforcing hardware limits on a system on chip (SoC). The system includes a plurality of chip components provided on a system on chip (SoC). A network of local limit manager (LLM) components is distributed on the SoC. Each LLM component is in communication with a corresponding sensor module that monitors one or more of the chip components. Each LLM component comprises a generic hardware structure for enforcing one or more hardware limits associated with the corresponding sensor module.

4 Claims, 7 Drawing Sheets

(51) Int. Cl.
  *G06F 11/00* (2006.01)
  *G06F 1/20* (2006.01)
  *G06F 1/28* (2006.01)
  *G06F 1/30* (2006.01)
  *G06F 11/34* (2006.01)
  *G06F 11/07* (2006.01)

(56) References Cited

U.S. PATENT DOCUMENTS

| | | | | |
|---|---|---|---|---|
| 2003/0158697 A1* | 8/2003 | Gold | ................ | G06F 1/206 702/132 |
| 2008/0256381 A1* | 10/2008 | Jacobowitz | ............... | G06F 1/06 713/501 |
| 2009/0199020 A1* | 8/2009 | Bose | ................ | G06F 1/3203 713/300 |
| 2009/0307519 A1* | 12/2009 | Hyatt | ................ | G06F 1/3203 713/502 |
| 2010/0073068 A1* | 3/2010 | Cho | ................ | G05D 23/1934 327/513 |
| 2010/0207604 A1* | 8/2010 | Bitsch | ................ | G01R 21/133 324/140 R |
| 2013/0080803 A1* | 3/2013 | Ananthakrishnan | ..... | G01K 7/42 713/320 |
| 2013/0159755 A1* | 6/2013 | Presant | ................ | G06F 1/206 713/340 |
| 2013/0169347 A1* | 7/2013 | Kim | ................ | G06F 1/206 327/513 |
| 2013/0227327 A1 | 8/2013 | Chun et al. | | |
| 2013/0246820 A1 | 9/2013 | Branover et al. | | |
| 2014/0028377 A1 | 1/2014 | Rosik et al. | | |
| 2014/0189413 A1* | 7/2014 | Hasenplaugh | ........ | G06F 9/5094 713/340 |
| 2014/0195828 A1* | 7/2014 | Varma | ................ | G01R 21/133 713/300 |
| 2015/0066420 A1* | 3/2015 | Moore | ................ | G06F 1/206 702/132 |
| 2015/0106642 A1* | 4/2015 | Naffziger | ................ | G06F 1/26 713/340 |

OTHER PUBLICATIONS

International Search Report and Written Opinion—PCT/US2015/028065—ISA/EPO—Aug. 13, 2015.

* cited by examiner

SYSTEMS AND METHODS FOR PROVIDING LOCAL HARDWARE LIMIT MANAGEMENT AND ENFORCEMENT

CROSS-REFERENCE TO RELATED APPLICATIONS

This application claims the benefit of the priority of U.S. Provisional Patent Application No. 61/985,938, entitled "Systems and Methods for Providing Local Hardware Limit Management and Enforcement" and filed on Apr. 29, 2014, which is hereby incorporated by reference in its entirety.

DESCRIPTION OF THE RELATED ART

Portable computing devices (e.g., cellular telephones, smart phones, tablet computers, portable digital assistants (PDAs), and portable game consoles) continue to offer an ever-expanding array of features and services, and provide users with unprecedented levels of access to information, resources, and communications. To keep pace with these service enhancements, such devices have become more powerful and more complex. Portable computing devices now commonly include a system on chip (SoC) comprising one or more chip components embedded on a single substrate (e.g., one or more central processing units (CPUs), a graphics processing unit (GPU), digital signal processors, etc.).

During operation of such devices, it is desirable to prevent the chip components from exceeding certain physical limits (e.g., temperature, current or transient (di/dt) limits), which can lead to device failure. Device and component manufacturers may also desire to reduce the design margin between the physical limits and the operating conditions of the device. The time constants for these limits can vary greatly. For example, transient events in the range of 1-2 nanoseconds may lead to voltage droop and brown-out failure. Transient events are dependent on the power density and idle-to-on, on-to-idle transition times of certain components (e.g., CPU, GPU, DSP), on-die capacitance, and package inductance. Cost and form-factor requirements drive package inductance up and on-die capacitance down, making the transient current problem worse.

Present consumption limits of a switch mode power supply (SMPS) and the battery in the power delivery network (PDN) may involve time constants in the range of 100 nanoseconds to 1 microsecond. In such cases, current limits must be enforced for each SMPS and for the battery. It is possible to exceed the battery limit but not any SMPS limit. It is also possible to exceed a single SMPS limit without exceeding the battery or any other SMPS limit. This is further complicated by the efficiency losses of the SMPS, which varies with load current, voltages, and SMPS mode. Thermal limits may involve time constants in the range of 1 millisecond to 50 milliseconds. If a thermal limit is exceed, chip components may be damaged. However, leakage current has a strong temperature dependency and can be a significant portion of total power for some die material and workloads.

Current solutions for managing and enforcing hardware limits management sense an undesirable event and then initiate a mitigation action to prevent the condition from getting worse. Typically, hardware is responsible for ensuring the limit is enforced within some bounds. Software solutions are generally ineffective for sensing and managing limits for events below approximately 100 microseconds. Furthermore, non-real-time software solutions, such as employed in many operating systems, are subject to indeterminism and cannot be relied on to handle events even occurring in 100 microsecond range.

A common solution for hardware limit management and enforcement is to use a centralized microcontroller with real-time firmware running on the die or a pure hardware solution, each of which have limitations and disadvantages. While dedicated on-die microcontrollers are flexible and much easier to design because the firmware running on the microcontroller can be changed post-silicon, they consume more area and are generally not as efficient as a pure hardware solution. They also require all of the sensor data to be routed to the centralized microcontroller for processing and then mitigation routed back out to the areas that need mitigation. All of this data movement requires time and makes it more challenging to get all the sensors read and decisions made within real-time constraints. Pure hardware implementations tend to be limited and customized to work with a particular hardware component. Therefore, they require significant design effort from each component team and are often not portable across projects or process technologies. While such implementations are capable of achieving faster response times, they struggle to handle transient events in the range of 1-2 nanoseconds or below.

Accordingly, there is a need for improved systems and methods for managing and enforcing hardware limits in a SoC.

SUMMARY OF THE DISCLOSURE

Systems and methods are disclosed for providing local hardware limit management and enforcement. One embodiment is a system for managing and enforcing hardware limits on a system on chip (SoC). The system comprises a SoC having a plurality of chip components and an interconnected network of local limit manager (LLM) components. The LLM components are dispersed over an area of the SoC. Each LLM component is in communication with a corresponding sensor module that monitors one or more of the chip components. Each LLM component comprises a generic hardware structure for enforcing one or more hardware limits associated with the corresponding sensor module.

Another embodiment is a method for providing hardware limit management and enforcement. One such method comprises: a sensor module monitoring a chip component on a system on chip (SoC); storing sensor data from the sensor module in a local limit management (LLM) hardware component; storing a hardware limit associated with the sensor module in the LLM hardware component; comparing the sensor data to the hardware limit; and if the sensor data exceeds the hardware limit, initiating a predefined throttling action for enforcing the hardware limit.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone", "wireless communication device," and "wireless handset" are used interchangeably. With the advent of third generation ("3G") wireless technology and four generation ("4G"), greater bandwidth availability has enabled more portable computing devices with a greater variety of wireless capabilities. Therefore, a portable computing device may include a cellular telephone, a pager, a PDA, a smartphone, a navigation device, or a hand-held computer with a wireless connection or link.

Figure 1:
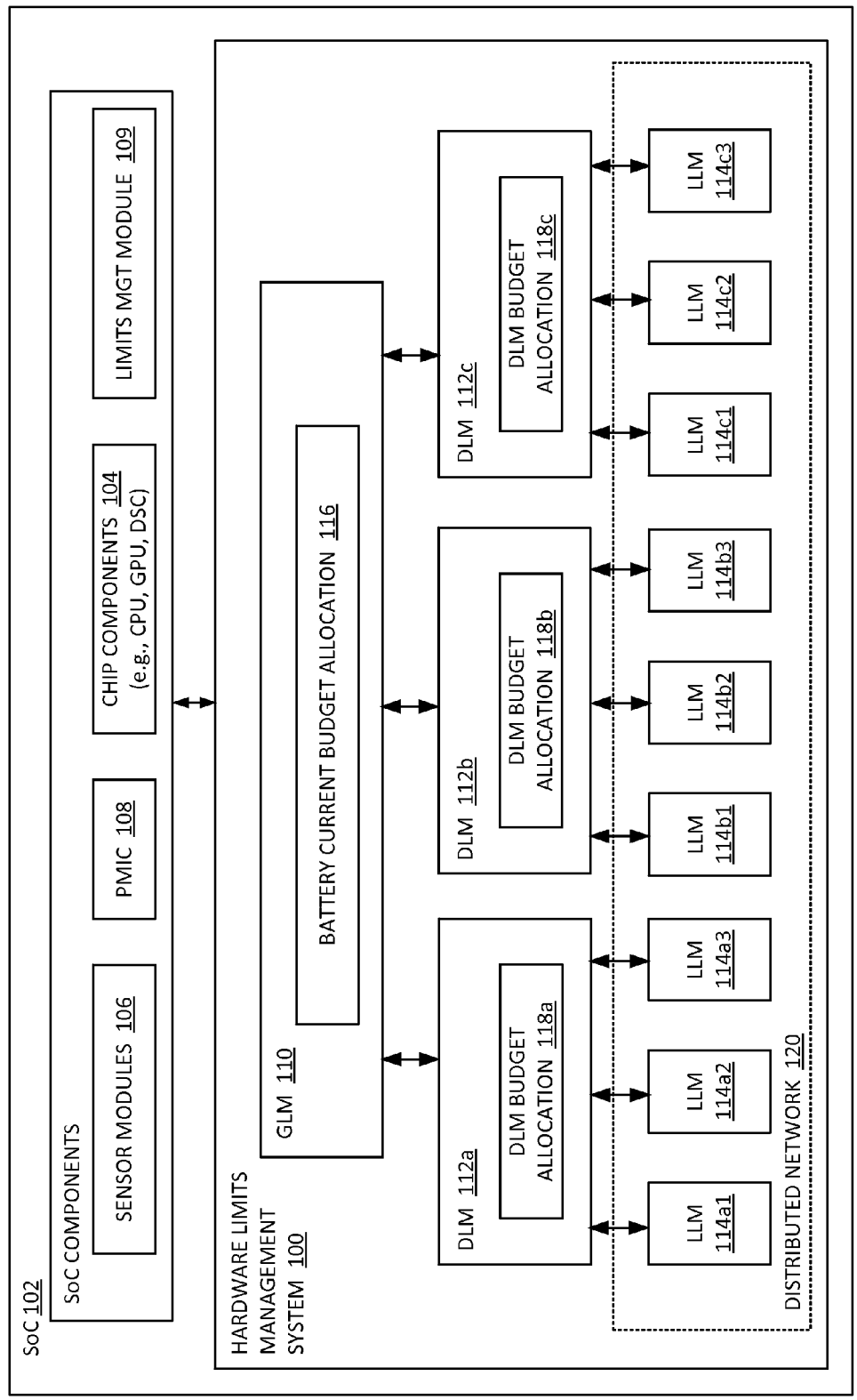
FIG. 1 is a block diagram of an embodiment of a system for providing hardware limit management and enforcement in a system on chip (SoC).

FIG. 1 illustrates an embodiment of a system on chip (SoC) 102 incorporating a hardware limits management system 100. The SoC 102 embodying the 100 hardware limits management system 100 may be implemented in any computing device, including a personal computer, a workstation, a server, a portable computing device (PCD), such as a cellular telephone, a portable digital assistant (PDA), a portable game console, a palmtop computer, or a tablet computer. As illustrated in the embodiment of FIG. 1, the SoC 102 comprises various components, including sensor modules 106 and chip components 104 to be monitored by the sensor modules 106 and for which the hardware limits management system 100 enforces one or more hardware limits. Chip components 104 may comprise central processing units (CPUs), graphics processing units (GPUs), digital signal processors (DSPs), video codecs, or any other on-die component having hardware limits to be monitored and enforced via the hardware limits management system 100. A power management integrated circuit (PMIC) 108 may be incorporated either on the SoC 102 or as a separate chip. It should be appreciated that the hardware limits management system 100 may be implemented using any desirable types, quantities, and configurations of sensor modules 106.

As illustrated in FIG. 1, the hardware limits management system 100 generally comprises a hierarchical limits management/enforcement framework comprising a global limits manager (GLM) component 110, a plurality of domain limits management (DLM) components 112, and a distributed hardware network 120 of local limits management (LLM) components 114. The SoC 102 may include a single GLM component 110 for budgeting allocation of resources to a plurality of DLM components. It should be appreciated that individual instances of a DLM component are identified with reference numbers 112a, 112b, and 112c and collectively identified with reference number 112). In an embodiment, the GLM component 110 budgets allocation of power supply current via, for example, battery current budget allocation module(s) 116.

Each DLM component 112a, 112b, and 112c may control budget allocation for one or more associated LLM components 114 in a parent/child relationship. As illustrated in FIG. 1, a parent DLM component 112a may comprise a DLM budget allocation module 118a for controlling budget allocation to LLM components 114a1, 114a2, and 114a3. A parent DLM component 112b may comprise a DLM budget allocation module 118b for controlling budget allocation to LLM components 114b1, 114b2, and 114b3. A parent DLM component 112c may comprise a DLM budget allocation module 118c for controlling budget allocation to LLM components 114c1, 114c2, and 114c3. As described below in more detail, each DLM component 112 on the SoC 102 may correspond to a separate voltage domain having a dedicated switched mode power supply (SMPS). It should be appreciated that any number of GLM, DLM, and LLM components may be incorporated on SoC 102.

The distributed network 120 of LLM components 120 may be dispersed over an area of the SoC 102 in any desirable configuration and/or quantity as needed to accommodate design considerations. It should be appreciated that the distributed network 120 may be designed to reduce the margin (e.g., voltage, current, thermal & power margins) that may otherwise be left on the table to ensure the limit management/enforcement platform is stable. The margin reductions provided by the distributed network 120 may offset the power cost of the hardware, which can be translated into overall performance improvement, power reduction or Bill of Materials (BOM) cost reduction.

One of ordinary skill in the art will appreciate that the distributed network 120 may provide a relatively small footprint, yet highly configurable and reusable, set of limit management blocks (e.g., LLM components 114) that various chip component teams (e.g., CPU, GPU, DSP, modem, etc.) may use to enforce local limits. The LLM components 114 may be interconnected to form the distributed network 120. In this manner, the LLM components 114 provide a hardware infrastructure, which is simultaneously capable of fast, local, hardware-based limits enforcement and capable of global optimizations across multiple units. The LLM components 114 may provide a generic set of mechanisms to map each component team's unique sensors to their unique mitigation mechanisms, which may obviate the need for customization. Each software driver may be exposed to the same generic register structures within the LLM component 114 for each unique component. Software (e.g., limits management module(s) 109) may configure the hardware behavior by setting certain control register bits inside the LLM component 114. Furthermore, each LLM component 114 may be timing converged to work with the chip component(s) 104 it is management.

Figure 6:
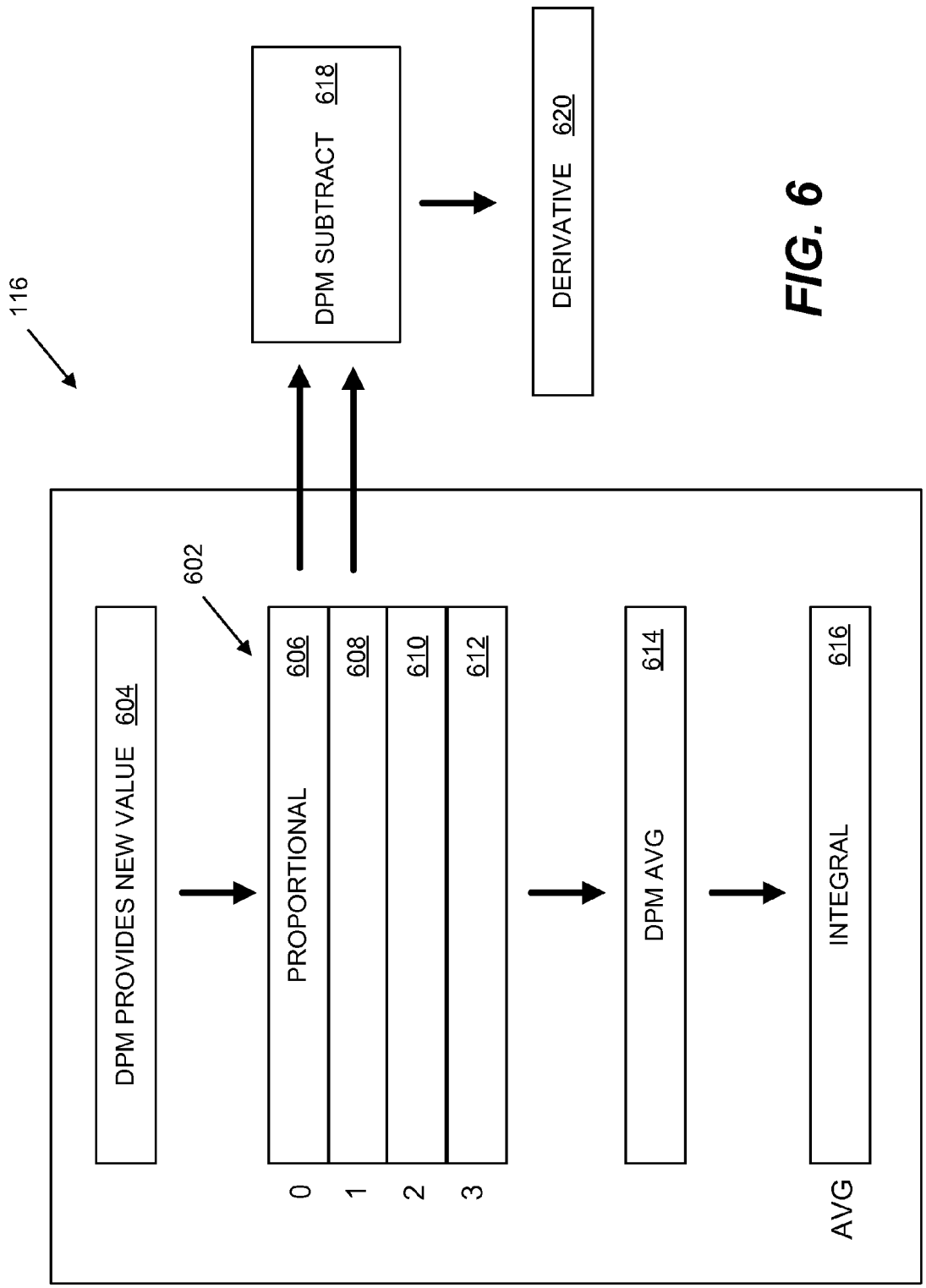
FIG. 6 is a combined block/flow diagram illustrating an embodiment of a generic hardware structure for implementing the local limit manager (LLM) components in the system of FIG. 1.

In an embodiment, the generic hardware structure of the LLM components 114 may be configured with various unique capabilities for managing and enforcing hardware limits. Each LLM component 114 may map sensor input from any sensor module 106 (e.g., current, power, temperature, voltage, SMPS efficiency, etc.) into a generic structure. The structure can be configured to aggregate and average samples over a period of time, which may enable the structure to operate on sensor data coming in as fast as the clock component it is managing. For a typical CPU, this could be in the range of 2-4 GHz or just a few hundred picoseconds. For a slower component (e.g., an audio engine operating at 100 MHz), this may be in the range of 10 nanoseconds. Furthermore, the aggregation enables any sensor data rate to be extended to any needed time constant, even extended out to ranges in the milliseconds, seconds, minutes, or hours). The structure may maintain a history of previous samples and a rolling average of previous samples. In the embodiment of FIG. 6, a first-in-first-out (FIFO) register may be used, although other methods and structures may be employed. A fixed time period clock reference may also be used to ensure all aggregated samples are equally spaced in time.

The generic structure may comprise one or more coefficients used to compute a threshold of the stored sensor data and compare it to a limit for that particular sensor type. Coefficients can be combined (e.g., through multiplication, addition, shifting, etc.) with each of the terms in the sensor storage structure. Because the sensor data may be equally spaced in time, various discrete time math functions may be applied in hardware to the sensor data (e.g., proportional, derivative, integral, etc.) to determine for example: (1) when any mitigation should take place; (2) how long the mitigation should be activated; and (3) which mitigation signals should be asserted.

The generic structure may also store threshold violations, based on any of the sensors to be combined and mapped to any number of mitigation capabilities supported by the particular component 104 being monitored (e.g., CPU, GPU, DSP, modem, etc.) For example, a first sensor module 106*a* running at 1 nanosecond and a second sensor module 106*b* running at 1 millisecond may be configured to simultaneously (yet independently) assert a single mitigation mechanism. Alternatively, the same two sensor modules 106*a* and 106*b* may both need to be at a certain level for the mitigation activity to be activated. Any number of sensor modules 106 and thresholds can be combined using any number of logic configurations (AND, OR, NAND, NOR, XOR, etc.). In this manner, a component team need only hook-up the sensor module(s) and mitigation capabilities unique to their implementation, and then the corresponding LLM component 114 may be configured to optimally link those capabilities together along with the appropriate limits.

Because the sensor modules 106 can run at high clock speeds, the onset of initial conditions that come before limit violations can be detected and preemptive mitigation asserted. One example of this is transient (di/dt) limits. Most hardware di/dt schemes rely on a voltage droop detector to detect that the di/dt event is occurring and then try to initiate mitigation before it is too late. One embodiment of this solution identifies the low current consumption condition has been reached such that a burst of current consumption could cause a voltage droop. In this case, the mitigation can be initiated at the onset of the initial condition instead of after it has already started, thereby preventing an excessive di/dt from being possible.

The LLM components 114 may be configured during initialization of the SoC 102 (at boot time), although the configuration may be changed during run time without any gaps in limits enforcement. The LLM components 114 may be programmed or controlled to enforce limits without sending an interrupt to software when throttling occurs. Short duration limit violations can cause problems to conventional mitigation systems because it can take more energy to make a change than was saved by making the transition. The distributed network 120 enables software (e.g., limits management module 109) to provide guidance to the LLM components 114 indicating how long it should enforce the limit through mitigation before asserting an interrupt to software. Furthermore, while many conventional hardware mitigation mechanisms are fast, they are not very energy efficient. The LLM components 114 may use a less efficient mitigation mechanism to achieve the needed response time and then, if mitigation lasts too long, may initiate a more efficient mitigation mechanism that will take more time. These other mechanisms may be hardware or software initiated, enabling short duration limits to be effectively filtered by the LLM components 114.

As mentioned above, the LLM components 114 may be connected together in a hierarchy. Each LLM component 114 in the hierarchy has all of the information needed to enforce local limits. For example, each LLM component 114 may know the associated limit(s), the values from the associated sensor module 106, the thresholds for the limit(s), and the mitigation mechanisms available for that particular component. The sensors may also be extremely fast, and thus the mitigation may also be very fast, covering a range of time constants with a single generic hardware structure. The hierarchy enables the LLM components 114 to share information about present sensor data and, therefore, allow limits for each LLM component 114 to dynamically change. For example, if several components 104 are sharing a single SMPS, the current limit may be dynamically divided among those components. Low-level guarantees to each active component may be enforced, but if several components are not using much, the other components can access the remaining allowed for its limit. In this regard, budgeting schemes may be employed to ensure the limits are not violated but also to enable maximum performance of one or two components when needed. Counters and other mechanisms can be used to ensure transitions to/from mitigation are smooth and have stable responses. The budgeting may also leverage hardware signaling from components that have scheduled wakeup/active events.

The GLM/DLM/LLM hierarchy also enables all the current consumption on each SMPS to be aggregated together and, therefore, SMPS current limits to be enforced. If this is not the lowest level of the hierarchy (i.e., LLM), then the DLM component 112 may periodically update the sensor budgets/limits to each of the child LLM components 114. The same block can compute the SMPS efficiency loss and then provide the adjusted (including loss) current back to its parent. In this regard, the generic hardware blocks may be placed appropriate to any chip or product power development network (PDN) and properly manage current limits at each SMPS and the battery in the PDN. The GLM/DLM/LLM hierarchy can even be extended to multi-chip implementations using the same components. It should be appreciated that the LLM components 114 represent reusable hardware components that can provide limits management for both very fast and very slow sensors, while also providing a generic map of those sensors to a component-specific mitigation mechanisms. Software sees the same generic structure and behavior for each LLM instance, making software easily portable across multiple chips and platforms.

The hardware limits management system 100 allows performance to be pushed as high as possible in the hierarchy, with the lowest possible design margins, yet without exceeding physical limits that would have a significant impact on the device. One of ordinary skill in the art will appreciate that the hardware limits management system 100 and the sensor module(s) 106 may enforce any desirable hardware limits, including, for example, PDN transient current and voltage droop, voltage rail current limits, battery current limits (BCL), or temperature limits, as well as any range of sample times and response times.

Figure 2:
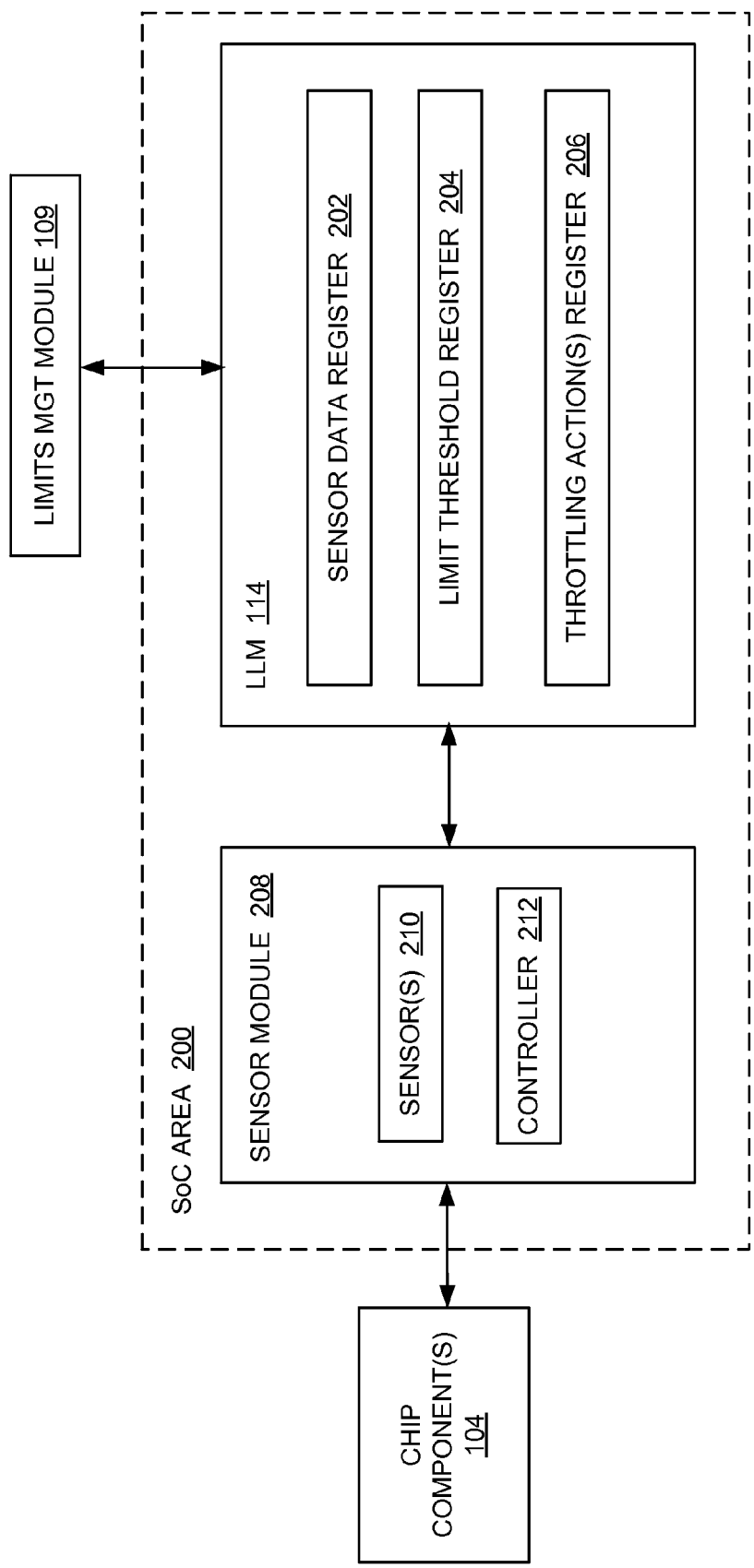
FIG. 2 is a block diagram illustrating an embodiment of a local limit manager (LLM) component.

FIG. 2 illustrates an embodiment of a generic hardware structure for implementing a LLM component 114. Each instance of the generic hardware structure has a corresponding sensor module 208 that monitors one or more chip components 104 on the SoC 102. Each instance of a sensor/LLM pairing is located in a different area 200 of the SoC 102 to provide the distributed network 120. In the embodiment illustrated in FIG. 2, the generic hardware structure comprises a sensor data register 202, a limit threshold register 204, and a throttling action register 206. The sensor data register 202 stores the sensor data generated by the sensor(s) 210 and controlled via a controller 212. The limit threshold register 204 stores one or more limit thresholds for the sensor data. The limit thresholds may be predefined or determined according to one or more stored coefficients, as mentioned above. The throttling action register 208 stores data associated with predefined throttling action(s) for initiating, calculating, and/or controlling corresponding mitigation techniques. The data stored in the LLM component 114 may be programmed by software (e.g., limits management module(s) 109).

FIG. 6 illustrates another embodiment of a first-in-first-out (FIFO) register 602 for implementing various aspects and functionality associated with the LLM component 114. In this embodiment, the sensor data is related to a sensor module 106 comprising a digital power meter (DPM), although it should be appreciated that alternative sensor modules, sensor data, and calculations may be employed. At block 604, the DPM provides a new value to the FIFO register 602. The values are stored in register locations 606, 608, 610, 612, etc. in a first-in-first-out manner. The values may comprise proportional sensor input, which may be averages to define a DPM average in a register location 614. The DPM average may be used to calculate integral sensor data, which may be stored in a register location 616. In other embodiments, the sensor input values may be operated on by other logic computations (e.g., subtraction block 618) to calculate derivative sensor data, which may be stored in a register location 620.

One of ordinary skill in the art will appreciate that each instance of a sensor/LLM pairing comprises hardware configured to monitor itself (i.e., sensor/LLM hardware). In an embodiment, the sensor module 106 comprises a digital power meter (DPM) configured to estimate one or more of an active current consumption, a leakage current, and a temperature. The sensor/LLM hardware may be configured to compare the sensor values against known (pre-programmed) limits and take (pre-programmed) actions to prevent those limits from being exceeded. The sensor/LLM hardware may provide short-term limits enforcement for events that are short-lived and self-correcting, as well as events that are long-lived, providing enough time for software to be notified. Software notifications may be used to assist in determining what is happening and to make adjustments that are more globally optimized.

The sensor module 106 and the corresponding LLM component 114 may be functionally coupled to leverage a computational engine used by both components. To further illustrate this coupling, an exemplary implementation of a digital power meter (DPM) will be described. The DPM provides an accurate, in-situ, current consumption estimate of one or more digital design blocks in real time. Both active current and leakage current estimation may be estimated, accommodating changes to temperature, voltage, and frequency at run time. Adjustments for process variation (per unit) may be made based on calibration during manufacturing and testing. Various models may be provided for specific chip components, number of signals being monitored, and operational frequency. Analog component current can be modeled based on the signals used to configure bias current consumption, data rates, and output power levels, which may be obtained by the DPM infrastructure.

LLM hardware may be configured to compare the estimated current (from the DPM) against limits and/or budgets set by software and initiate pre-defined actions when any of those limits are reached. The limits comparison may incorporate complex functions and sophisticated thresholds (e.g., PID=Proportional, Integral, Differential thresholds) may be provided to minimize limit margins. One of ordinary skill in the art will appreciate that various throttling and/or mitigation actions may be initiated, including, for example, the assertion of software interrupts, the assertion of local hardware throttling actions, etc. Additional computations using the DPM computation engine may be provided for LLM hardware functions. Some of these functions may be initiated at periodic intervals (and triggered automatically with each DPM cycle), while others may only be needed at certain times and be initiated by the LLM hardware. Examples of non-periodic events that initiate computations include frequency or voltage changes, budget allocation changes made by software, etc.

The SoC area 200 and power overhead of the DPM and/or LLM functions may be minimized. In this regard, DPM and LLM hardware may be tightly designed together in order to ensure that the values (e.g., units, binary point locations, scale of time, etc.) produced by the DPM are readily consumable by the LLM hardware. Furthermore, the DPM/LLM hardware architecture may be highly configurable (e.g., in hardware through, for example, #ifdef statements) so that each instance can be scaled to most closely meet the specific needs of a chip component 104. In this manner, low area and power overhead may be achieved at the expense of design and non-recurring engineering (NRE) verification NRE.

Figure 3:
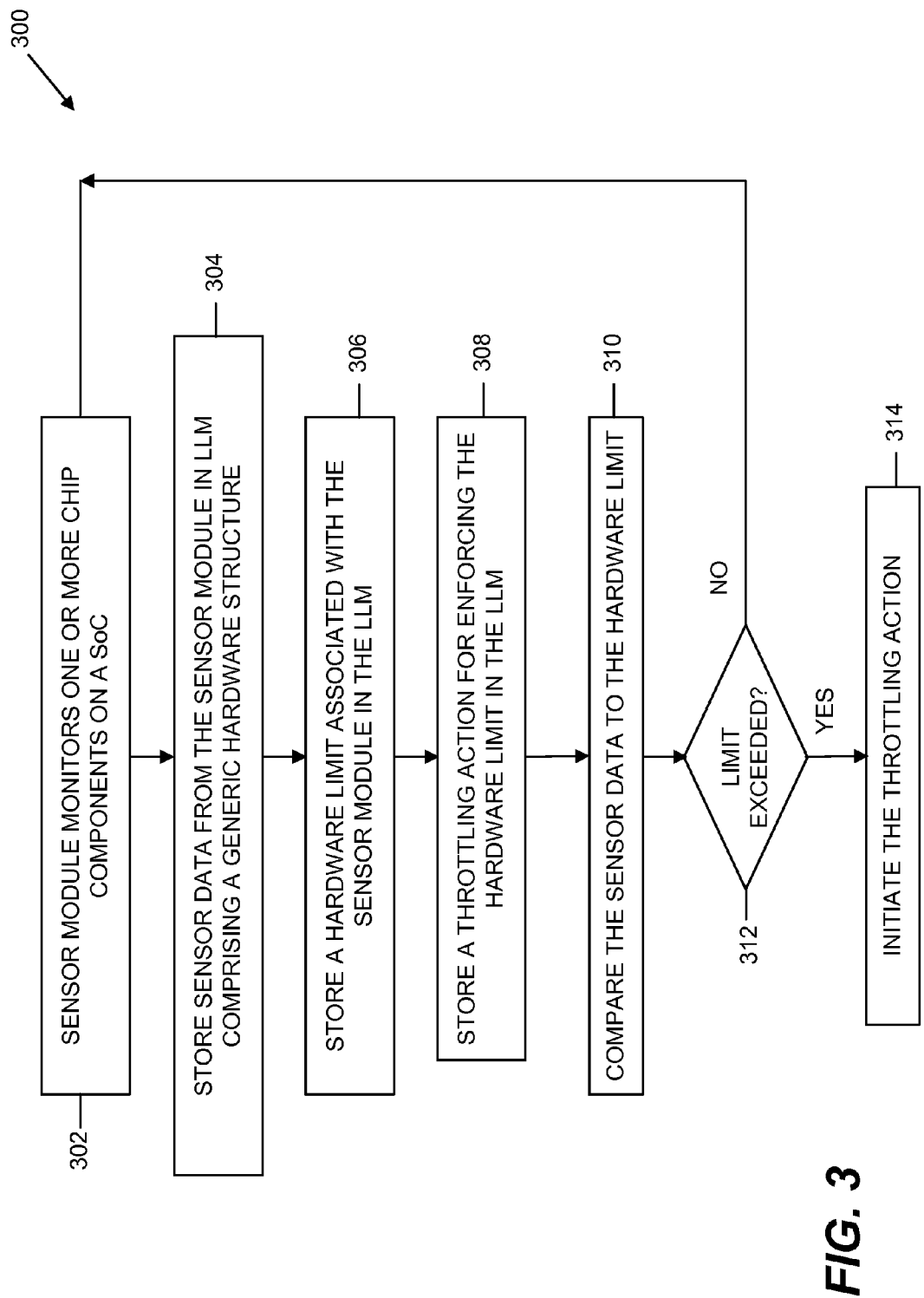
FIG. 3 is a flowchart illustrating an embodiment of a method for providing local hardware limit management and enforcement in the system of FIG. 1.

FIG. 3 illustrates an embodiment of a method 300 implemented by one or more components in the hardware limits management/enforcement system 100. The method 300 is described with reference to a single instance of the generic hardware structure for simplicity. At block 302, a sensor module 106 monitors one or more chip components 104 on the SoC 102. The sensor module 106 may be configured to generate sensor data for monitoring and enforcing any of the hardware limits described above. At block 304, the sensor data from the sensor module 106 is stored in the corresponding LLM component 114. The sensor data may be stored in a first register (e.g., sensor data register 202—FIG. 2) or as illustrated in FIG. 6. As mentioned above, the generic hardware structure may store various types of data for enforcing the hardware limits. At block 306, the generic hardware structure may store one or more thresholds in a threshold register 204. The threshold register 204 may also store coefficients used to determine whether the sensor data exceeds the thresholds. At block 308, the generic hardware structure may also store data for predefined throttling action(s) to be initiated if the sensor data exceeds the thresholds. The throttling action data may be stored in a throttling actions register 206. At block 310, the sensor data may be compared to the thresholds to determine if a hardware limit has been exceeded or a condition exists that may lead to the hardware limit being exceeded. If the hardware limit is exceeded (decision block 312), the throttling actions register may be accessed to initiate an appropriate mitigation action for enforcing the hardware limit. If the hardware limit is not exceeded, flow may generally return to block 302.

It should be appreciated that some of the stored data described in connection with FIG. 3 may be pre-configured via software. The software may change the pre-configured values while the hardware is enforcing the limits without losing the limits enforcement capability. In an embodiment, this may be implemented with a set of pre-configured registers that software can adjust and then allowing software to command the hardware to switch between the two groups of pre-configured registers. In this manner, the hardware may do the switch at a time when computations are not being done and ensure all limits are still enforced with a self-consistent set of pre-configured register contents. Furthermore, the software can make a global adjustment to the LM system to improve performance when, for example, significant, long-term use-case changes occur in the system.

It should be appreciated that software can make various global optimizations to the hardware limits management system 100. In an embodiment, the optimization software may reconfigure pre-programmed values in the hardware limits management system 100. In this manner, the hardware limits management system 100 may be changed while running without impacting or corrupting the limits, thresholds, or other computations. In other words, the hardware limits management system 100 suffers no loss of limit enforcement capability during a configuration change.

Figure 4:
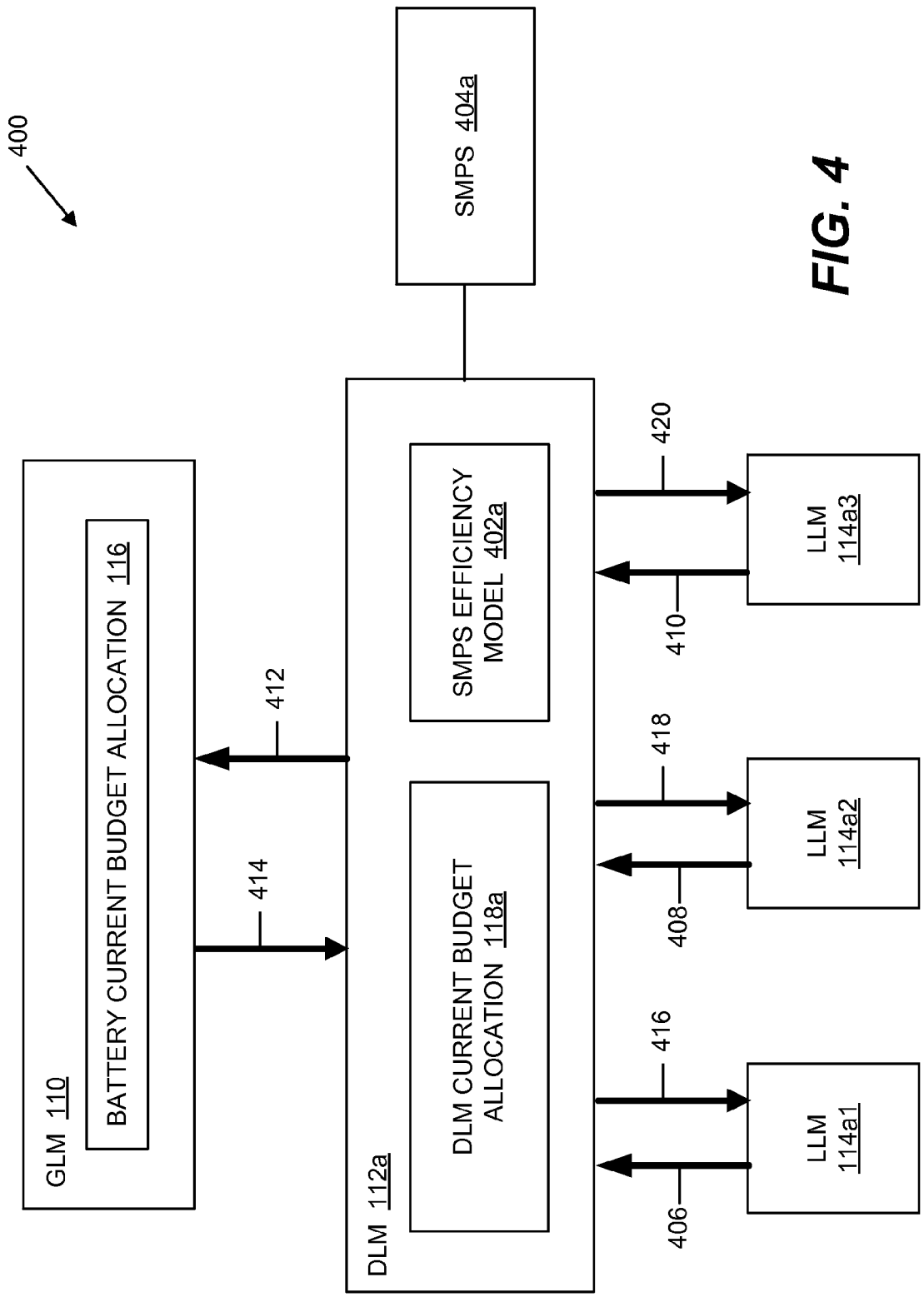
FIG. 4 is a combined block/flow diagram illustrating an embodiment of a method for providing dynamic current budget allocation in the system of FIG. 1.

As illustrated in FIG. 4, the GLM/DLM/LLM hierarchical architecture of the hardware limits management/enforcement system 100 may provide various budget allocation features. The battery current capability of a device incorporating the SoC 102 may be divided up among various power rails in the system. A DLM component 112 may comprise a budgeting algorithm for each SMPS in the PDN. FIG. 4 illustrates a DLM component 112a comprising a DLM current budget allocation module 118a for an associated SMPS 404a. The GLM 110 may comprise a battery current budget allocation module 116 configured to manage and divide the total available current by percentages (e.g., Weighted Binary Budgets) first from the battery to each SMPS 404 directly connected to the battery. This process may be repeated for each SMPS 404 in the PDN. In this manner, the battery current may be divided into current limits (eventually for each chip component 104). With respect to DLM component 112a, each child LLM component 114a1, 114a2, and 114a3 knows a present current limit as allocated through the hierarchy from GLM 110 to DLM component 112a.

It should be appreciated that the GLM component 110 or the DLM component 112 may be configured to provide global optimization and allocation of budgets to each LLM component 114. Each LLM component 114 can enforce the allocated budgets using, for example, hardware throttling mechanism, with low enough latency to prevent hard-failures and provide sufficient time for GLM 110 to be notified and make a global optimization adjustment. Software management overhead may be reduced because it no longer needs to monitor the system directly, instead relying on the LLM components 114 to signal if a pre-programmed limit threshold is crossed. One of ordinary skill in the art will appreciate that the GLM component 110 or the DLM component 112 may interface with other logic, including, for example, scheduler mechanisms and DCVS algorithms.

Figure 5:
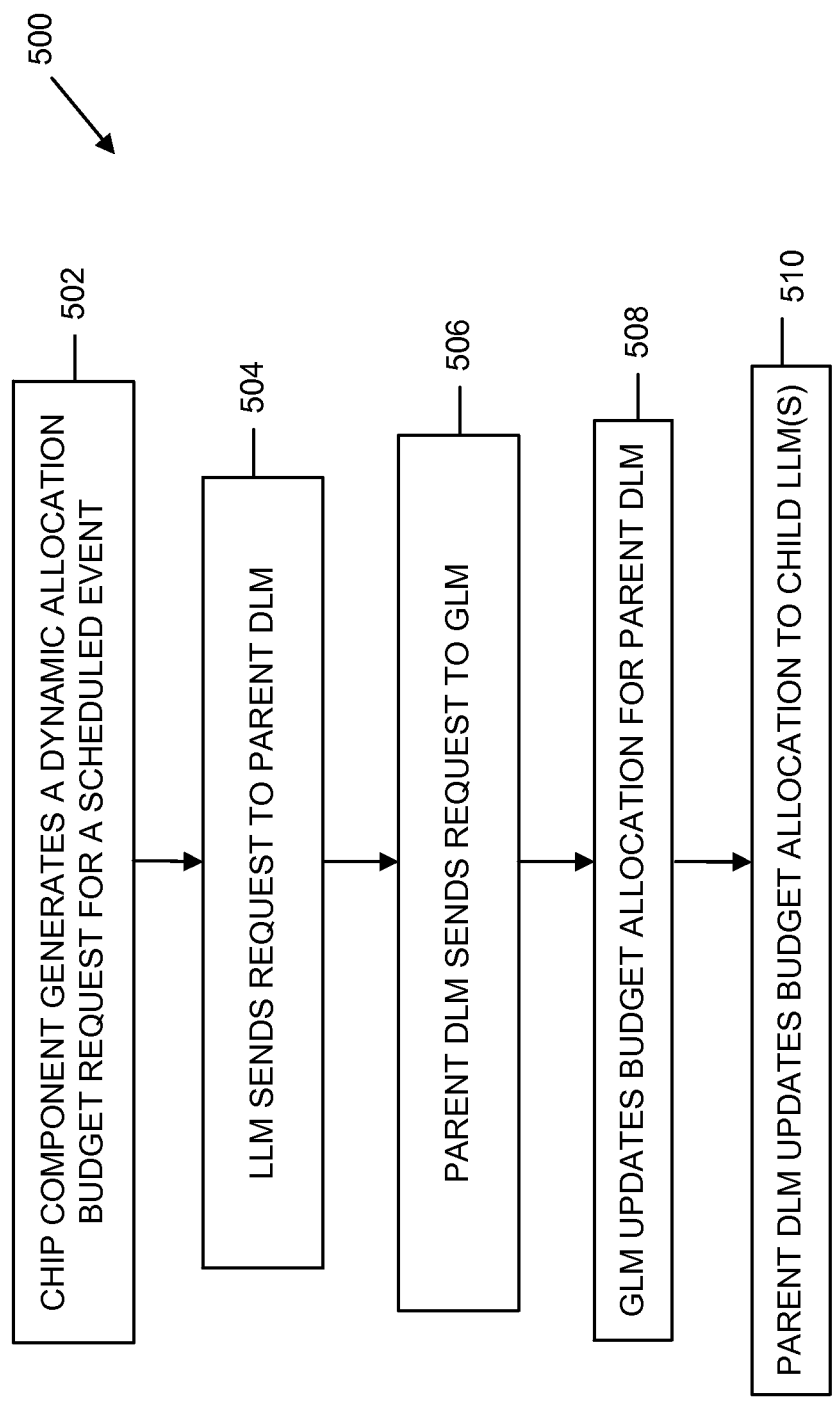
FIG. 5 is a flowchart illustrating another embodiment of a method for providing dynamic current budget allocation.

Referring to FIGS. 4 & 5, the hardware limits management system 100 may also provide dynamic current budget allocation based on requests from the LLM components 114. If an LLM component 114 has reached a limit and needs more current budget, then it makes a request to the DLM component 112. LLM component 114a1, 114a2, and 114a3 may provide request 406, 408, and 410, respectively, to the DLM component 112a. The DLM current budget allocation module 118a may process requests in priority order according to a dynamic current allocation priority. Dynamic current allocation priority may comprise an ordered binary value, in which lower values have higher priority. An algorithm may iterate through the LLM instances according to the dynamic current allocation priority. For each LLM with a valid current request, the request is subtracted from the dynamic allocation budget. DLM component 112a may provide the updated allocated budgets to the LLM components 114a1, 114a2, and 114a3 via response 416, 418, and 420, respectively. It should be further appreciated that the GLM component 110 may dynamically allocate budgets to DLM component 112a via appropriate requests 412 and responses 414. In other embodiments, requests for more current budget may occur if a chip component is consuming more current than budgeted. In this case, it may not have to be initiated because of a scheduled event.

FIG. 5 illustrates an embodiment of a dynamic budget allocation method initiated by an event scheduling function provided by a chip component 104. Some chip components 104 may have schedulers and periodically wake up to transmit or receive information. These events are scheduled and signaling from these components can be sent to a LLM component 114 (block 502) in advance of the event. The new power required (which may be different for different rails) may be known based on the mode of operation & bit error rate, distance from the base station, etc. The transmit/receive (Tx/Rx) power may be a significant portion of the battery limit. Therefore, it may be desirable to link the scheduling function to the dynamic allocation algorithm in the LLM component 114.

To facilitate this capability, the scheduler may assert a signal to the corresponding LLM component indicating that the dynamic power increase required for the Tx/Rx event be provided. The LLM component would then send the corresponding current request(s) to the parent DLM component (block 504) along with the extra current required. The extra current required may be based on some knowledge of the mode and power levels of the chip component 104. This may be known to the component scheduler making the request. The current required may be encoded and provided to the DPM for modeling the active current consumption anyway. The LLM component can determine the amount of current to request from the parent DLM component. The parent DLM component may send appropriate requests (block 506) and receive response request (block 508) from the GLM component 110, as needed. At block 510, the parent DLM component updates the budget allocation to the child LLM components.

Figure 7:
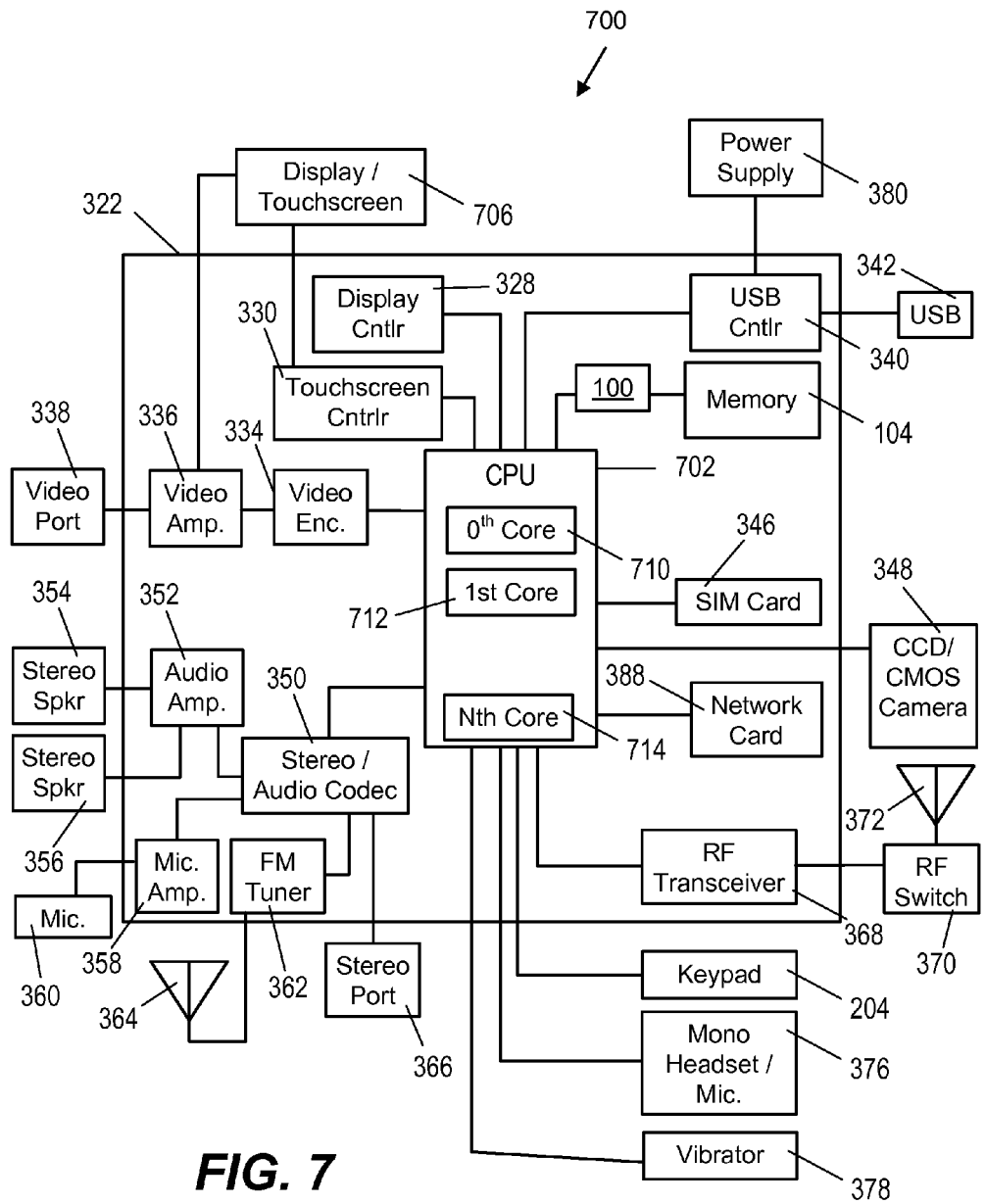
FIG. 7 is a block diagram of an embodiment of a portable computer device for incorporating the system of FIG. 1.

As mentioned above, the hardware limits management system 100 may be incorporated into any desirable computing system. FIG. 7 illustrates the hardware limits management system 100 incorporated in an exemplary portable computing device (PCD) 700. The SoC 322 may include a multicore CPU 702. The multicore CPU 702 may include a zeroth core 710, a first core 712, and an Nth core 714. One of the cores may comprise, for example, a graphics processing unit (GPU) with one or more of the others comprising the CPU.

A display controller 328 and a touch screen controller 330 may be coupled to the CPU 802. In turn, the touch screen display 706 external to the on-chip system 322 may be coupled to the display controller 328 and the touch screen controller 330.

FIG. 7 further shows that a video encoder 334, e.g., a phase alternating line (PAL) encoder, a sequential color a memoire (SECAM) encoder, or a national television system(s) committee (NTSC) encoder, is coupled to the multicore CPU 702. Further, a video amplifier 336 is coupled to the video encoder 334 and the touch screen display 706. Also, a video port 338 is coupled to the video amplifier 336. As shown in FIG. 7, a universal serial bus (USB) controller 340 is coupled to the multicore CPU 702. Also, a USB port 342 is coupled to the USB controller 340. Memory 104 and a subscriber identity module (SIM) card 346 may also be coupled to the multicore CPU 702. Memory 104 may reside on the SoC 322 or be coupled to the SoC 322.

Further, as shown in FIG. 7, a digital camera 348 may be coupled to the multicore CPU 702. In an exemplary aspect, the digital camera 348 is a charge-coupled device (CCD) camera or a complementary metal-oxide semiconductor (CMOS) camera.

As further illustrated in FIG. 7, a stereo audio coder-decoder (CODEC) 350 may be coupled to the multicore CPU 702. Moreover, an audio amplifier 352 may coupled to the stereo audio CODEC 350. In an exemplary aspect, a first stereo speaker 354 and a second stereo speaker 356 are coupled to the audio amplifier 352. FIG. 7 shows that a microphone amplifier 358 may be also coupled to the stereo audio CODEC 350. Additionally, a microphone 360 may be coupled to the microphone amplifier 358. In a particular aspect, a frequency modulation (FM) radio tuner 362 may be coupled to the stereo audio CODEC 350. Also, an FM antenna 364 is coupled to the FM radio tuner 362. Further, stereo headphones 366 may be coupled to the stereo audio CODEC 350.

FIG. 7 further illustrates that a radio frequency (RF) transceiver 368 may be coupled to the multicore CPU 702. An RF switch 370 may be coupled to the RF transceiver 368 and an RF antenna 372. A keypad 204 may be coupled to the multicore CPU 702. Also, a mono headset with a microphone 376 may be coupled to the multicore CPU 702. Further, a vibrator device 378 may be coupled to the multicore CPU 802.

FIG. 7 also shows that a power supply 380 may be coupled to the on-chip system 322. In a particular aspect, the power supply 380 is a direct current (DC) power supply that provides power to the various components of the PCD 700 that require power. Further, in a particular aspect, the power supply is a rechargeable DC battery or a DC power supply that is derived from an alternating current (AC) to DC transformer that is connected to an AC power source.

FIG. 7 further indicates that the PCD 700 may also include a network card 388 that may be used to access a data network, e.g., a local area network, a personal area network, or any other network. The network card 388 may be a Bluetooth network card, a WiFi network card, a personal area network (PAN) card, a personal area network ultra-low-power technology (PeANUT) network card, a television/cable/satellite tuner, or any other network card well known in the art. Further, the network card 388 may be incorporated into a chip, i.e., the network card 388 may be a full solution in a chip, and may not be a separate network card 388.

As depicted in FIG. 7, the touch screen display 706, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 may be external to the on-chip system 322.

It should be appreciated that one or more of the method steps described herein may be stored in the memory as computer program instructions, such as the modules described above. These instructions may be executed by any suitable processor in combination or in concert with the corresponding module to perform the methods described herein.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, NAND flash, NOR flash, M-RAM, P-RAM, R-RAM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Alternative embodiments will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for providing hardware limit management and enforcement, the method comprising:
   monitoring a chip component on a system on chip (SoC) with a sensor module;
   storing sensor data from the sensor module in a local limit management (LLM) hardware component, wherein the sensor data comprises an estimated current consumption of the monitored chip component and wherein the LLM hardware component is associated with a domain limit manager (DLM) component in a parent/child relationship such that the DLM component is configured as a parent component to budget a programmable battery current consumption limit to a child LLM component;
   storing the battery current consumption limit in the LLM hardware component;
   comparing the estimated current consumption of the monitored chip component to the battery consumption limit stored in the LLM hardware component; and
   if the estimated current consumption exceeds the battery consumption limit, initiating a predefined throttling action for enforcing the battery consumption limit.

2. The method of claim 1, wherein the chip component comprises one or more of a central processing unit (CPU), a graphics processing unit (GPU), and a digital signal processor (DSP).

3. The method of claim 1, wherein the sensor module comprises a digital power meter (DPM).

4. The method of claim 1, wherein the storing the sensor data in the LLM hardware component further comprises sampling the sensor data at a predefined time constant.

* * * * *